(12) United States Patent
Raghavan et al.

(10) Patent No.: US 11,012,135 B2
(45) Date of Patent: May 18, 2021

(54) SENSOR-DRIVEN SYSTEMS AND METHODS TO ACTIVATE AND DEACTIVATE BEAM SCANNING

(71) Applicant: QUALCOMM Incorporated, San Diego, CA (US)

(72) Inventors: Vasanthan Raghavan, West Windsor Township, NJ (US); Junyi Li, Chester, NJ (US); Assaf Touboul, Netanya (IL)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 15/882,339

(22) Filed: Jan. 29, 2018

(65) Prior Publication Data
US 2018/0269954 A1 Sep. 20, 2018

Related U.S. Application Data

(60) Provisional application No. 62/472,502, filed on Mar. 16, 2017.

(51) Int. Cl.
*H04B 7/06* (2006.01)
*H04B 7/08* (2006.01)

(52) U.S. Cl.
CPC ......... *H04B 7/0695* (2013.01); *H04B 7/0628* (2013.01); *H04B 7/088* (2013.01)

(58) Field of Classification Search
CPC .......... H04B 7/0602–061; H04B 7/0817–0834
See application file for complete search history.

(56) References Cited

U.S. PATENT DOCUMENTS

| | | | |
|---|---|---|---|
| 9,426,724 B2 | 8/2016 | Parron et al. | |
| 2006/0203789 A1 | 9/2006 | Iacono et al. | |
| 2016/0021548 A1 | 1/2016 | Raghavan et al. | |
| 2016/0182163 A1* | 6/2016 | Guey ................... | H04B 17/318 |
| | | | 455/63.4 |
| 2017/0054534 A1 | 2/2017 | Sang et al. | |
| 2017/0094565 A1* | 3/2017 | Sharma ............... | H04L 65/1016 |
| 2017/0094595 A1 | 3/2017 | Radhakrishnan et al. | |
| 2017/0134083 A1 | 5/2017 | Kim et al. | |
| 2017/0141892 A1* | 5/2017 | Lu ......................... | H04L 5/0048 |
| 2017/0155439 A1* | 6/2017 | Chang .................. | H04B 7/0617 |
| 2017/0156066 A1* | 6/2017 | Shiotani ............... | H04B 17/318 |
| 2017/0164291 A1* | 6/2017 | Ludwig ............. | H04W 52/0245 |

(Continued)

OTHER PUBLICATIONS

International Search Report and Written Opinion—PCT/US2018/016006—ISA/EPO—dated Apr. 30, 2018.

*Primary Examiner* — Marcus Smith
(74) *Attorney, Agent, or Firm* — Arent Fox, LLP

(57) ABSTRACT

The apparatus is configured to performing a beam scan operation. The beam scan operation may be part of an active beam scanning process. The apparatus is also configured to deactivate the beam scan process upon determining that the apparatus is in a first state corresponding to at least one of a first set of conditional states. The apparatus is configured to determine a state change of the apparatus. Additionally, the apparatus is configured to activating the beam scanning process upon determining that the apparatus is in a second state corresponding to at least one of a second set of conditional states different from the first set of states. The apparatus is also configured to performing the beam scan operation upon activating the beam scanning process.

19 Claims, 8 Drawing Sheets

(56) References Cited

U.S. PATENT DOCUMENTS

| | | | |
|---|---|---|---|
| 2017/0215117 A1 | 7/2017 | Kwon et al. | |
| 2017/0374500 A1* | 12/2017 | Guy | H04W 52/0254 |
| 2018/0062717 A1* | 3/2018 | Mok | H04B 7/0408 |
| 2018/0191422 A1* | 7/2018 | Xia | H04B 7/0834 |
| 2019/0007906 A1* | 1/2019 | Hessler | H04B 7/0695 |
| 2019/0158345 A1* | 5/2019 | Lincoln | H04W 52/0251 |
| 2019/0166553 A1* | 5/2019 | Ryoo | H04W 76/20 |
| 2019/0208569 A1* | 7/2019 | Lee | H04B 7/0802 |

\* cited by examiner

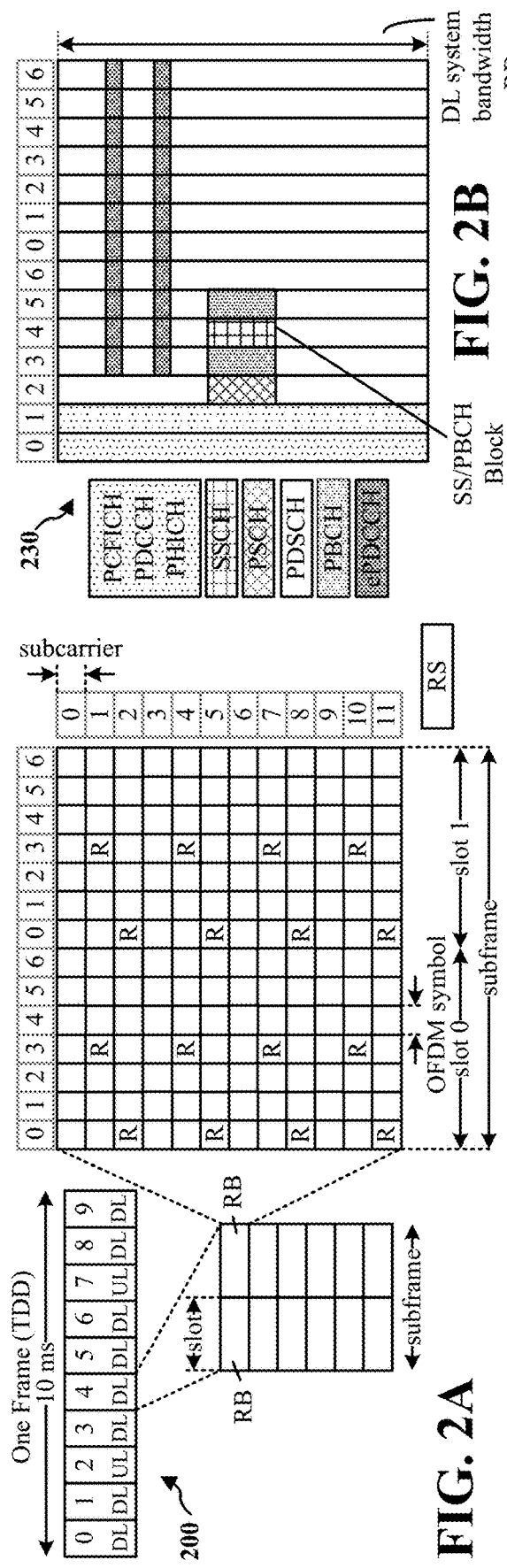
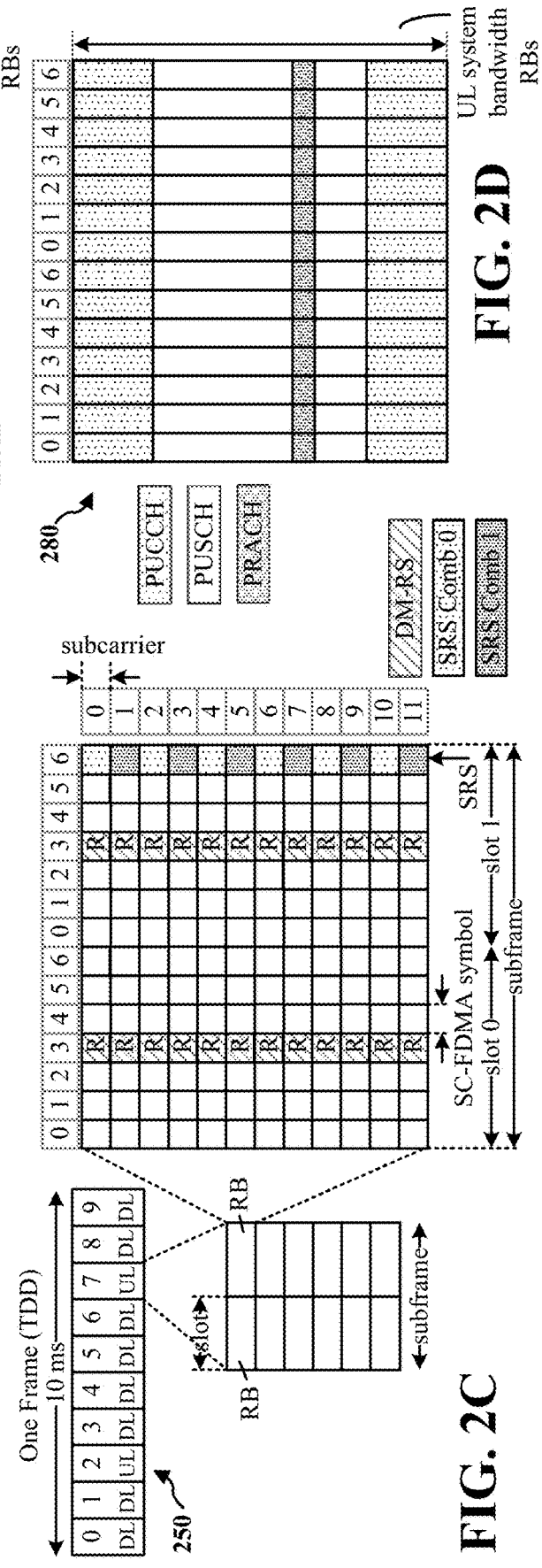
FIG. 2A  FIG. 2B  FIG. 2C  FIG. 2D

SENSOR-DRIVEN SYSTEMS AND METHODS TO ACTIVATE AND DEACTIVATE BEAM SCANNING

CROSS-REFERENCE TO RELATED APPLICATION(S)

This application claims the benefit of U.S. Provisional Application Ser. No. 62/472,502, entitled "SENSOR-DRIVEN SYSTEMS AND METHODS TO TURN ON/OFF BEAM SCANNING" and filed on Mar. 16, 2017, which is expressly incorporated by reference herein in its entirety.

BACKGROUND

Technical Field

The present disclosure relates generally to communication systems, and more particularly, to systems and methods that turn on and off beam scanning of an apparatus in a communication system.

INTRODUCTION

Wireless communication systems are widely deployed to provide various telecommunication services such as telephony, video, data, messaging, and broadcasts. Typical wireless communication systems may employ multiple-access technologies capable of supporting communication with multiple users by sharing available system resources. Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example telecommunication standard is 5G New Radio (NR). 5G NR is part of a continuous mobile broadband evolution promulgated by Third Generation Partnership Project (3GPP) to meet new requirements associated with latency, reliability, security, scalability (e.g., with Internet of Things (IoT)), and other requirements. Some aspects of 5G NR may be based on the 4G Long Term Evolution (LTE) standard. There exists a need for further improvements in 5G NR technology. These improvements may also be applicable to other multi-access technologies and the telecommunication standards that employ these technologies.

Wireless communications systems such as 5G NR may use beam forming. In order to take advantage of the beam forming, it may be necessary for an apparatus to scan a plurality of beams to determine which particular beam to use for communications. Beam scanning may consume power or other communication apparatus resources. Accordingly, it may be preferable to improve the efficiency of beam scanning.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

As discussed above, wireless communications systems such as 5G NR may use beam forming. In order to take advantage of the beam forming, it may be necessary for an apparatus such as a UE or base station to scan a plurality of beams to determine which particular beam to use for communications. For example, a base station may scan a plurality of beams to determine which beam to use to communicate with a UE. Similarly, a UE may scan a plurality of beams to determine which beam to use to communicate with a base station. Beam scanning, however, consumes power, e.g., battery power of a UE, or may consume other resources. Accordingly, it may be preferable to beam scan only when the beam scanning is needed for a communication between a base station and a UE, between two UEs, or other communications between two apparatuses.

The aspects presented herein improve the efficiency of beam scanning operations. An example of the systems and methods described herein may associate a binary state (e.g., active or inactive) for a UE or base station. The active state may be entered when beam scanning is determined to be necessary or desired for communication. The inactive state may be entered when beam scanning is not necessary or not desired for communication (or no communication is occurring for a given device).

Considerations for entering an inactive state at a UE may include the UE screen being in a locked state, the UE screen being in an off state, the UE being in a pocket or other container, the UE being in a voice mode, the UE not being in a data mode, the UE being in a low-rate mode, the UE being outside or leaving a coverage area. Considerations for entering an inactive state at a base station may include a determination that no UEs being serviced by the base station are in a beam-scanning state. Considerations for entering an active state at a UE may include the UE screen being in an unlocked state, the UE screen being in an on state, the UE not being in a pocket or other container, the UE not being in a voice mode, the UE being in a data mode, the UE being in a high-rate mode, the UE being inside or entering a coverage area. Considerations for entering an active state at a base station may include a determination that one or more UEs serviced by the base station are in a beam scanning state or expected to enter a beam scanning state. In some examples, a current state or changing states may also be based on a user setting.

In an aspect of the disclosure, a method, a computer-readable medium, and an apparatus are provided. The apparatus is configured to performing a beam scan operation. The beam scan operation may be part of an active beam scanning process. The apparatus is also configured to deactivate the beam scan process upon determining that the apparatus is in a first state corresponding to at least one of a first set of conditional states. The apparatus is configured to determine a state change of the apparatus. Additionally, the apparatus is configured to activating the beam scanning process upon determining that the apparatus is in a second state corresponding to at least one of a second set of conditional states different from the first set of states. The apparatus is also configured to performing the beam scan operation upon activating the beam scanning process.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

FIGS. 2A, 2B, 2C, and 2D are diagrams illustrating examples of a DL frame structure, DL channels within the DL frame structure, an UL frame structure, and UL channels within the UL frame structure, respectively.

DETAILED DESCRIPTION

Figure 1:
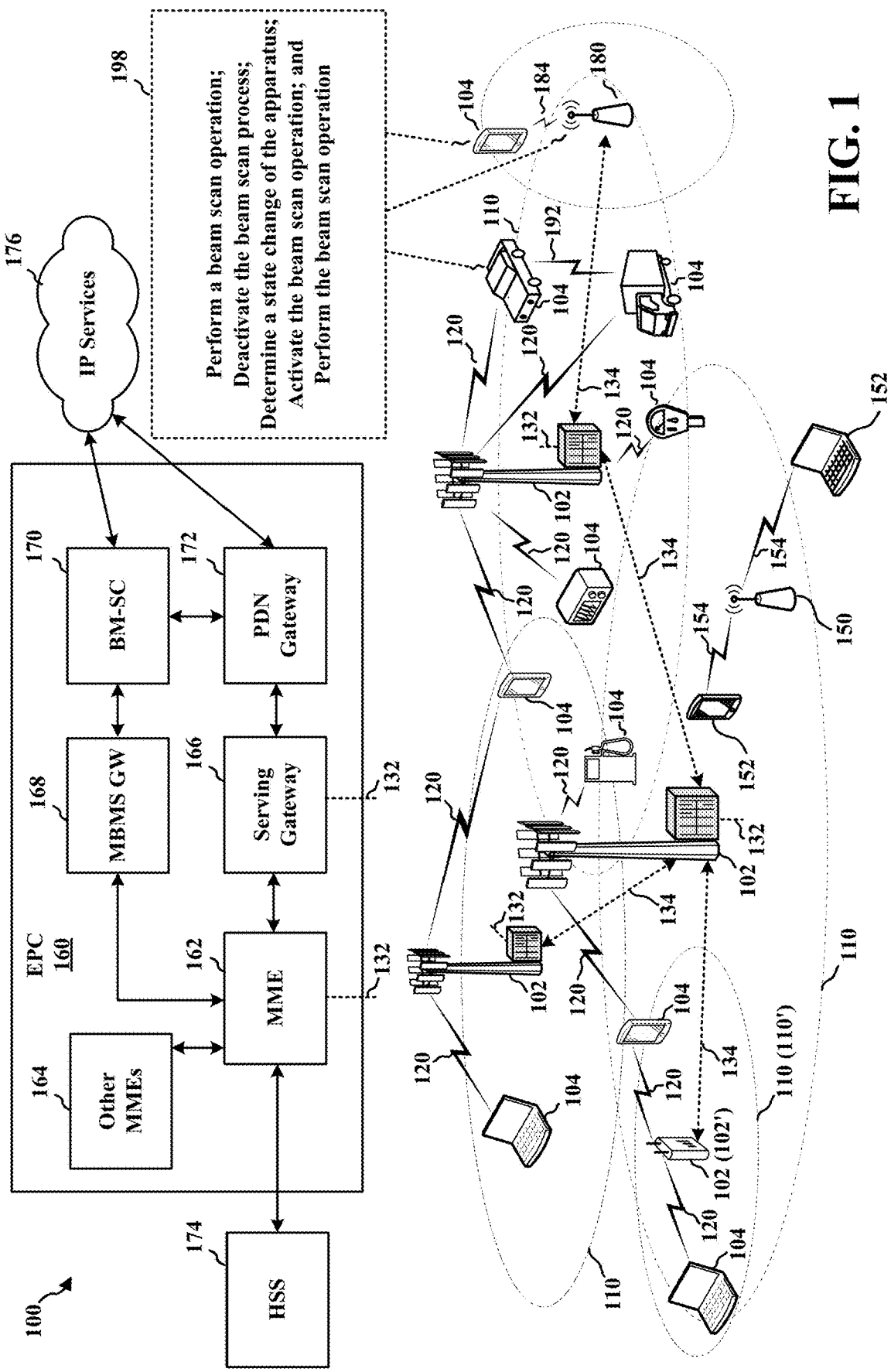
FIG. 1 is a diagram illustrating an example of a wireless communications system and an access network.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well-known structures and components are shown in block diagram form in order to avoid obscuring such concepts.

Several aspects of telecommunication systems will now be presented with reference to various apparatus and methods. These apparatus and methods will be described in the following detailed description and illustrated in the accompanying drawings by various blocks, components, circuits, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors. Examples of processors include microprocessors, microcontrollers, graphics processing units (GPUs), central processing units (CPUs), application processors, digital signal processors (DSPs), reduced instruction set computing (RISC) processors, systems on a chip (SoC), baseband processors, field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software components, applications, software applications, software packages, routines, subroutines, objects, executables, threads of execution, procedures, functions, etc., whether referred to as software, firmware, middleware, microcode, hardware description language, or otherwise.

Accordingly, in one or more example embodiments, the functions described may be implemented in hardware, software, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise a random-access memory (RAM), a read-only memory (ROM), an electrically erasable programmable ROM (EEPROM), optical disk storage, magnetic disk storage, other magnetic storage devices, combinations of the aforementioned types of computer-readable media, or any other medium that can be used to store computer executable code in the form of instructions or data structures that can be accessed by a computer.

FIG. 1 is a diagram illustrating an example of a wireless communications system and an access network 100. The wireless communications system (also referred to as a wireless wide area network (WWAN)) includes base stations 102, UEs 104, and an Evolved Packet Core (EPC) 160. The base stations 102 may include macro cells (high power cellular base station) and/or small cells (low power cellular base station). The macro cells include base stations. The small cells include femtocells, picocells, and microcells.

The base stations 102 (collectively referred to as Evolved Universal Mobile Telecommunications System (UMTS) Terrestrial Radio Access Network (E-UTRAN)) interface with the EPC 160 through backhaul links 132 (e.g., S1 interface). In addition to other functions, the base stations 102 may perform one or more of the following functions: transfer of user data, radio channel ciphering and deciphering, integrity protection, header compression, mobility control functions (e.g., handover, dual connectivity), inter-cell interference coordination, connection setup and release, load balancing, distribution for non-access stratum (NAS) messages, NAS node selection, synchronization, radio access network (RAN) sharing, multimedia broadcast multicast service (MBMS), subscriber and equipment trace, RAN information management (RIM), paging, positioning, and delivery of warning messages. The base stations 102 may communicate directly or indirectly (e.g., through the EPC 160) with each other over backhaul links 134 (e.g., X2 interface). The backhaul links 134 may be wired or wireless.

The base stations 102 may wirelessly communicate with the UEs 104. Each of the base stations 102 may provide communication coverage for a respective geographic coverage area 110. There may be overlapping geographic coverage areas 110. For example, the small cell 102' may have a coverage area 110' that overlaps the geographic coverage area 110 of one or more macro base stations 102. A network that includes both small cell and macro cells may be known as a heterogeneous network. A heterogeneous network may also include Home Evolved Node Bs (eNBs) (HeNBs), which may provide service to a restricted group known as a closed subscriber group (CSG). The communication links 120 between the base stations 102 and the UEs 104 may include uplink (UL) (also referred to as reverse link) transmissions from a UE 104 to a base station 102 and/or downlink (DL) (also referred to as forward link) transmissions from a base station 102 to a UE 104. The communication links 120 may use multiple-input and multiple-output (MIMO) antenna technology, including spatial multiplexing, beamforming, and/or transmit diversity. The communication links may be through one or more carriers. The base stations 102/UEs 104 may use spectrum up to Y MHz (e.g., 5, 10, 15, 20, 100 MHz) bandwidth per carrier allocated in a carrier aggregation of up to a total of Yx MHz (x component carriers) used for transmission in each direction. The carriers may or may not be adjacent to each other. Allocation of carriers may be asymmetric with respect to DL and UL (e.g., more or less carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

Certain UEs 104 may communicate with each other using device-to-device (D2D) communication link 192. The D2D communication link 192 may use the DL/UL WWAN spectrum. The D2D communication link 192 may use one or more sidelink channels, such as a physical sidelink broadcast channel (PSBCH), a physical sidelink discovery channel (PSDCH), a physical sidelink shared channel (PSSCH), and a physical sidelink control channel (PSCCH). D2D communication may be through a variety of wireless D2D communications systems, such as for example, FlashLinQ, WiMedia, Bluetooth, ZigBee, Wi-Fi based on the IEEE 802.11 standard, LTE, or NR.

The wireless communications system may further include a Wi-Fi access point (AP) 150 in communication with Wi-Fi stations (STAs) 152 via communication links 154 in a 5 GHz unlicensed frequency spectrum. When communicating in an unlicensed frequency spectrum, the STAs 152/AP 150 may perform a clear channel assessment (CCA) prior to communicating in order to determine whether the channel is available.

The small cell 102' may operate in a licensed and/or an unlicensed frequency spectrum. When operating in an unlicensed frequency spectrum, the small cell 102' may employ NR and use the same 5 GHz unlicensed frequency spectrum as used by the Wi-Fi AP 150. The small cell 102', employing NR in an unlicensed frequency spectrum, may boost coverage to and/or increase capacity of the access network.

The gNodeB (gNB) 180 may operate in millimeter wave (mmW) frequencies and/or near mmW frequencies in communication with the UE 104. When the gNB 180 operates in mmW or near mmW frequencies, the gNB 180 may be referred to as an mmW base station. Extremely high frequency (EHF) is part of the RF in the electromagnetic spectrum. EHF has a range of 30 GHz to 300 GHz and a wavelength between 1 millimeter and 10 millimeters. Radio waves in the band may be referred to as a millimeter wave. Near mmW may extend down to a frequency of 3 GHz with a wavelength of 100 millimeters. The super high frequency (SHF) band extends between 3 GHz and 30 GHz, also referred to as centimeter wave. Communications using the mmW/near mmW radio frequency band has extremely high path loss and a short range. The mmW base station (gNB 180) may utilize beamforming 184 with the UE 104 to compensate for the extremely high path loss and short range.

The EPC 160 may include a Mobility Management Entity (MME) 162, other MMEs 164, a Serving Gateway 166, a Multimedia Broadcast Multicast Service (MBMS) Gateway 168, a Broadcast Multicast Service Center (BM-SC) 170, and a Packet Data Network (PDN) Gateway 172. The MME 162 may be in communication with a Home Subscriber Server (HSS) 174. The MME 162 is the control node that processes the signaling between the UEs 104 and the EPC 160. Generally, the MME 162 provides bearer and connection management. All user Internet protocol (IP) packets are transferred through the Serving Gateway 166, which itself is connected to the PDN Gateway 172. The PDN Gateway 172 provides UE IP address allocation as well as other functions. The PDN Gateway 172 and the BM-SC 170 are connected to the IP Services 176. The IP Services 176 may include the Internet, an intranet, an IP Multimedia Subsystem (IMS), a PS Streaming Service (PSS), and/or other IP services. The BM-SC 170 may provide functions for MBMS user service provisioning and delivery. The BM-SC 170 may serve as an entry point for content provider MBMS transmission, may be used to authorize and initiate MBMS Bearer Services within a public land mobile network (PLMN), and may be used to schedule MBMS transmissions. The MBMS Gateway 168 may be used to distribute MBMS traffic to the base stations 102 belonging to a Multicast Broadcast Single Frequency Network (MBSFN) area broadcasting a particular service, and may be responsible for session management (start/stop) and for collecting eMBMS related charging information.

The base station may also be referred to as a gNB, Node B, evolved Node B (eNB), an access point, a base transceiver station, a radio base station, a radio transceiver, a transceiver function, a basic service set (BSS), an extended service set (ESS), or some other suitable terminology. The base station 102 provides an access point to the EPC 160 for a UE 104. Examples of UEs 104 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, a smart device, a wearable device, a vehicle, an electric meter, a gas pump, a large or small kitchen appliance, a healthcare device, an implant, a display, or any other similar functioning device. Some of the UEs 104 may be referred to as IoT devices (e.g., parking meter, gas pump, toaster, vehicles, heart monitor, etc.). The UE 104 may also be referred to as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology.

Referring again to FIG. 1, in certain aspects, the UE 104 and/or the base station 102 may be configured to perform a beam scan operation, the beam scan operation being part of an active beam scanning process. Additionally, the UE 104 and/or the base station 102 may be configured to deactivate the beam scanning process upon determining that the apparatus is in a state corresponding to at least one of a first set of conditional states. The UE 104 and/or the base station 102 may also be configured to determine a state change of the apparatus. Additionally, the UE 104 and/or the base station 102 may be configured to activate the beam scan operation upon determining that the apparatus is in a state corresponding to at least one of a second set of conditional states and perform the beam scan operation upon activating the beam scan operation (198). The beam scan operation is a beam measurement RS (BRS) scan where a base station (e.g., gNB) and a UE run through beams, e.g., over single sidebands (SSBs). The beam scan process is an underlying steady-state operation corresponding to a certain beam scanning timer. An aspect may set a timer to different values based on whether the UE is in an active or inactive state (e.g., corresponding to different task lists). The inactive state corresponds to a default timer value where no scanning happens, e.g., no beam scan operation. The active state corresponds to a timer setting (e.g., 20 ms, 40 ms, or other timer settings) during which beam scanning occurs.

FIG. 2A is a diagram 200 illustrating an example of a DL subframe within a 5G/NR frame structure. FIG. 2B is a diagram 230 illustrating an example of channels within the DL frame structure. FIG. 2C is a diagram 250 illustrating an example of an UL frame structure. FIG. 2D is a diagram 280 illustrating an example of channels within an UL subframe. The 5G/NR frame structure may be FDD in which for a particular set of subcarriers (carrier system bandwidth), subframes within the set of subcarriers are dedicated for either DL or UL, or may be TDD in which for a particular set of subcarriers (carrier system bandwidth), subframes within the set of subcarriers are dedicated for both DL and UL. In the examples provided by FIGS. 2A, 2C, the 5G/NR frame structure is assumed to be TDD, with subframe 4 a DL subframe and subframe 7 an UL subframe. While subframe 4 is illustrated as providing just DL and subframe 7 is illustrated as providing just UL, any particular subframe may be split into different subsets that provide both UL and DL. Note that the description, infra, applies also to a 5G/NR frame structure that is FDD.

Other wireless communication technologies may have a different frame structure and/or different channels. A frame (10 ms) may be divided into 10 equally sized subframes (1 ms). Each subframe may include one or more time slots. Each slot may include 7 or 14 symbols, depending on the slot configuration. For slot configuration 0, each slot may include 14 symbols, and for slot configuration 1, each slot may include 7 symbols. The number of slots within a subframe is based on the slot configuration and the numerology. For slot configuration 0, different numerologies 0 to 5 allow for 1, 2, 4, 8, 16, and 32 slots, respectively, per subframe. For slot configuration 1, different numerologies 0 to 2 allow for 2, 4, and 8 slots, respectively, per subframe. The subcarrier spacing and symbol length/duration are a function of the numerology. The subcarrier spacing may be equal to 15 kHZ, where µ is the numerology 0-5. The symbol length/duration is inversely related to the subcarrier spacing. FIGS. 2A, 2C provide an example of slot configuration 1 with 7 symbols per slot and numerology 0 with 2 slots per subframe. The subcarrier spacing is 15 kHz and symbol duration is approximately 66.7 µs.

A resource grid may be used to represent the frame structure. Each time slot includes a resource block (RB) (also referred to as physical RBs (PRBs)) that extends 12 consecutive subcarriers. The resource grid is divided into multiple resource elements (REs). The number of bits carried by each RE depends on the modulation scheme.

As illustrated in FIG. 2A, some of the REs carry reference (pilot) signals (RS) for the UE (indicated as R). The RS may include demodulation RS (DM-RS) and channel state information reference signals (CSI-RS) for channel estimation at the UE. The RS may also include BRS, beam refinement RS (BRRS), and phase tracking RS (PT-RS).

FIG. 2B illustrates an example of various channels within a DL subframe of a frame. The physical control format indicator channel (PCFICH) is within symbol 0 of slot 0, and carries a control format indicator (CFI) that indicates whether the physical downlink control channel (PDCCH) occupies 1, 2, or 3 symbols (FIG. 2B illustrates a PDCCH that occupies 3 symbols). The PDCCH carries downlink control information (DCI) within one or more control channel elements (CCEs), each CCE including nine RE groups (REGs), each REG including four consecutive REs in an OFDM symbol. A UE may be configured with a UE-specific enhanced PDCCH (ePDCCH) that also carries DCI. The ePDCCH may have 2, 4, or 8 RB pairs (FIG. 2B shows two RB pairs, each subset including one RB pair). The physical hybrid automatic repeat request (ARQ) (HARQ) indicator channel (PHICH) is also within symbol 0 of slot 0 and carries the HARQ indicator (HI) that indicates HARQ acknowledgement (ACK)/negative ACK (HACK) feedback based on the physical uplink shared channel (PUSCH). The primary synchronization channel (PSCH) may be within symbol 6 of slot 0 within subframes 0 and 5 of a frame. The PSCH carries a primary synchronization signal (PSS) that is used by a UE 104 to determine subframe/symbol timing and a physical layer identity. The secondary synchronization channel (SSCH) may be within symbol 5 of slot 0 within subframes 0 and 5 of a frame. The SSCH carries a secondary synchronization signal (SSS) that is used by a UE to determine a physical layer cell identity group number and radio frame timing. Based on the physical layer identity and the physical layer cell identity group number, the UE can determine a physical cell identifier (PCI). Based on the PCI, the UE can determine the locations of the aforementioned DL-RS. The physical broadcast channel (PBCH), which carries a master information block (MIB), may be logically grouped with the PSCH and SSCH to form a synchronization signal (SS)/PBCH block. The MIB provides a number of RBs in the DL system bandwidth, a PHICH configuration, and a system frame number (SFN). The physical downlink shared channel (PDSCH) carries user data, broadcast system information not transmitted through the PBCH such as system information blocks (SIBs), and paging messages.

As illustrated in FIG. 2C, some of the REs carry demodulation reference signals (DM-RS) for channel estimation at the base station. The UE may additionally transmit sounding reference signals (SRS) in the last symbol of a subframe. The SRS may have a comb structure, and a UE may transmit SRS on one of the combs. The SRS may be used by a base station for channel quality estimation to enable frequency-dependent scheduling on the UL. FIG. 2D illustrates an example of various channels within an UL subframe of a frame. A physical random access channel (PRACH) may be within one or more subframes within a frame based on the PRACH configuration. The PRACH may include six consecutive RB pairs within a subframe. The PRACH allows the UE to perform initial system access and achieve UL synchronization. A physical uplink control channel (PUCCH) may be located on edges of the UL system bandwidth. The PUCCH carries uplink control information (UCI), such as scheduling requests, a channel quality indicator (CQI), a precoding matrix indicator (PMI), a rank indicator (RI), and HARQ ACK/NACK feedback. The PUSCH carries data, and may additionally be used to carry a buffer status report (BSR), a power headroom report (PHR), and/or UCI.

Figure 3:
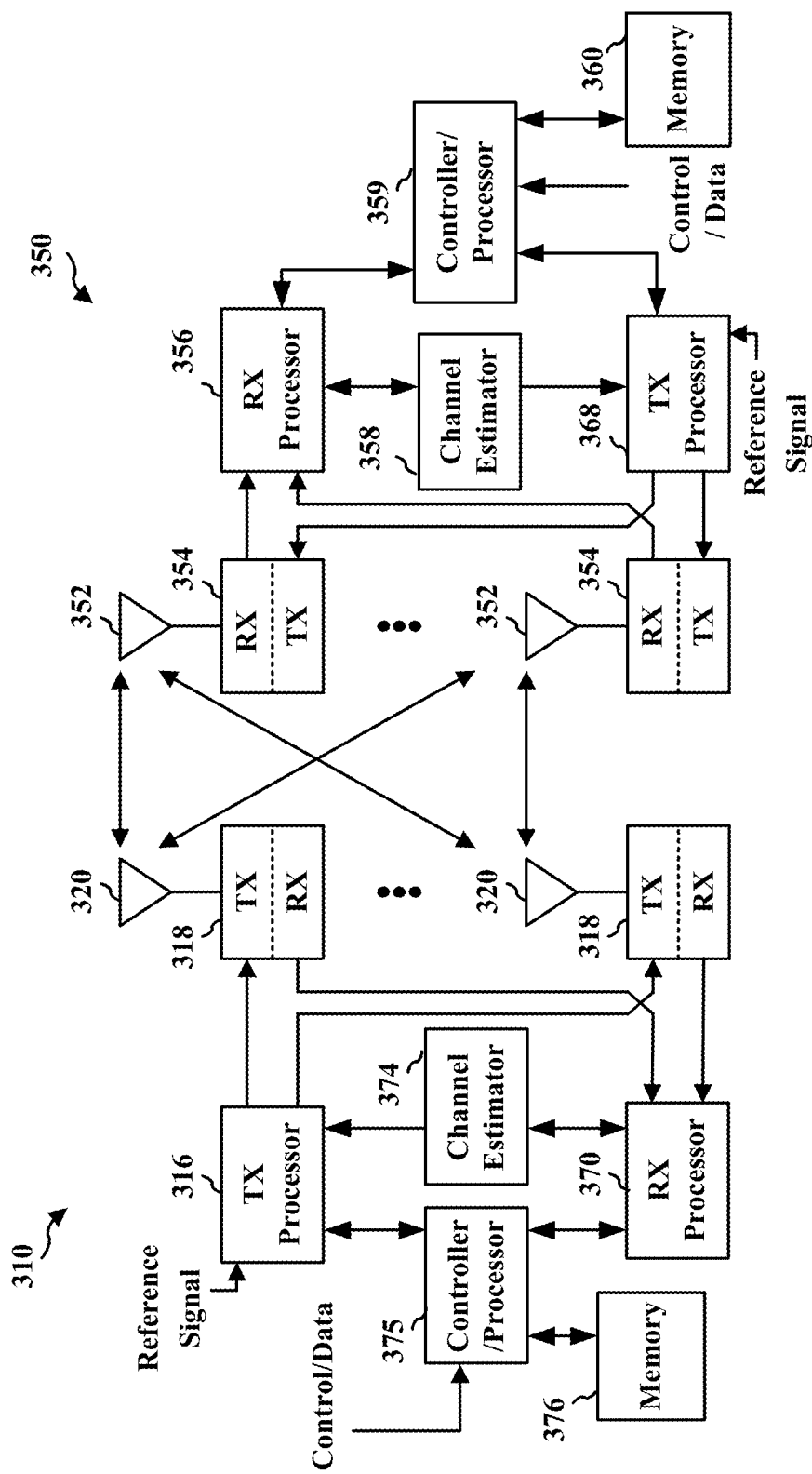
FIG. 3 is a diagram illustrating an example of a base station and user equipment (UE) in an access network.

FIG. 3 is a block diagram of a base station 310 in communication with a UE 350 in an access network. In the DL, IP packets from the EPC 160 may be provided to a controller/processor 375. The controller/processor 375 implements layer 3 and layer 2 functionality. Layer 3 includes a radio resource control (RRC) layer, and layer 2 includes a packet data convergence protocol (PDCP) layer, a radio link control (RLC) layer, and a medium access control (MAC) layer. The controller/processor 375 provides RRC layer functionality associated with broadcasting of system information (e.g., MIB, SIBs), RRC connection control (e.g., RRC connection paging, RRC connection establishment, RRC connection modification, and RRC connection release), inter radio access technology (RAT) mobility, and measurement configuration for UE measurement reporting; PDCP layer functionality associated with header compression/decompression, security (ciphering, deciphering, integrity protection, integrity verification), and handover support functions; RLC layer functionality associated with the transfer of upper layer packet data units (PDUs), error correction through ARQ, concatenation, segmentation, and reassembly of RLC service data units (SDUs), re-segmentation of RLC data PDUs, and reordering of RLC data PDUs; and MAC layer functionality associated with mapping between logical channels and transport channels, multiplexing of MAC SDUs onto transport blocks (TBs), demultiplexing of MAC SDUs from TBs, scheduling information reporting, error correction through HARQ, priority handling, and logical channel prioritization.

The transmit (TX) processor 316 and the receive (RX) processor 370 implement layer 1 functionality associated with various signal processing functions. Layer 1, which includes a physical (PHY) layer, may include error detection on the transport channels, forward error correction (FEC) coding/decoding of the transport channels, interleaving, rate matching, mapping onto physical channels, modulation/demodulation of physical channels, and MIMO antenna processing. The TX processor 316 handles mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols may then be split into parallel streams. Each stream may then be mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 374 may be used to determine the coding and modulation scheme, as well as for spatial processing. The channel estimate may be derived from a reference signal and/or channel condition feedback transmitted by the UE 350. Each spatial stream may then be provided to a different antenna 320 via a separate transmitter 318TX. Each transmitter 318TX may modulate an RF carrier with a respective spatial stream for transmission.

At the UE 350, each receiver 354RX receives a signal through its respective antenna 352. Each receiver 354RX recovers information modulated onto an RF carrier and provides the information to the receive (RX) processor 356. The TX processor 368 and the RX processor 356 implement layer 1 functionality associated with various signal-processing functions. The RX processor 356 may perform spatial processing on the information to recover any spatial streams destined for the UE 350. If multiple spatial streams are destined for the UE 350, they may be combined by the RX processor 356 into a single OFDM symbol stream. The RX processor 356 then converts the OFDM symbol stream from the time-domain to the frequency domain using a Fast Fourier Transform (FFT). The frequency domain signal comprises a separate OFDM symbol stream for each subcarrier of the OFDM signal. The symbols on each subcarrier, and the reference signal, are recovered and demodulated by determining the most likely signal constellation points transmitted by the base station 310. These soft decisions may be based on channel estimates computed by the channel estimator 358. The soft decisions are then decoded and deinterleaved to recover the data and control signals that were originally transmitted by the base station 310 on the physical channel. The data and control signals are then provided to the controller/processor 359, which implements layer 3 and layer 2 functionality.

The controller/processor 359 can be associated with a memory 360 that stores program codes and data. The memory 360 may be referred to as a computer-readable medium. In the UL, the controller/processor 359 provides demultiplexing between transport and logical channels, packet reassembly, deciphering, header decompression, and control signal processing to recover IP packets from the EPC 160. The controller/processor 359 is also responsible for error detection using an ACK and/or NACK protocol to support HARQ operations.

Similar to the functionality described in connection with the DL transmission by the base station 310, the controller/processor 359 provides RRC layer functionality associated with system information (e.g., MIB, SIBs) acquisition, RRC connections, and measurement reporting; PDCP layer functionality associated with header compression/decompression, and security (ciphering, deciphering, integrity protection, integrity verification); RLC layer functionality associated with the transfer of upper layer PDUs, error correction through ARQ, concatenation, segmentation, and reassembly of RLC SDUs, re-segmentation of RLC data PDUs, and reordering of RLC data PDUs; and MAC layer functionality associated with mapping between logical channels and transport channels, multiplexing of MAC SDUs onto TBs, demultiplexing of MAC SDUs from TBs, scheduling information reporting, error correction through HARQ, priority handling, and logical channel prioritization.

Channel estimates derived by a channel estimator 358 from a reference signal or feedback transmitted by the base station 310 may be used by the TX processor 368 to select the appropriate coding and modulation schemes, and to facilitate spatial processing. The spatial streams generated by the TX processor 368 may be provided to different antenna 352 via separate transmitters 354TX. Each transmitter 354TX may modulate an RF carrier with a respective spatial stream for transmission.

The UL transmission is processed at the base station 310 in a manner similar to that described in connection with the receiver function at the UE 350. Each receiver 318RX receives a signal through its respective antenna 320. Each receiver 318RX recovers information modulated onto an RF carrier and provides the information to a RX processor 370.

The controller/processor 375 can be associated with a memory 376 that stores program codes and data. The memory 376 may be referred to as a computer-readable medium. In the UL, the controller/processor 375 provides demultiplexing between transport and logical channels, packet reassembly, deciphering, header decompression, control signal processing to recover IP packets from the UE 350. IP packets from the controller/processor 375 may be provided to the EPC 160. The controller/processor 375 is also responsible for error detection using an ACK and/or NACK protocol to support HARQ operations.

Figure 4:
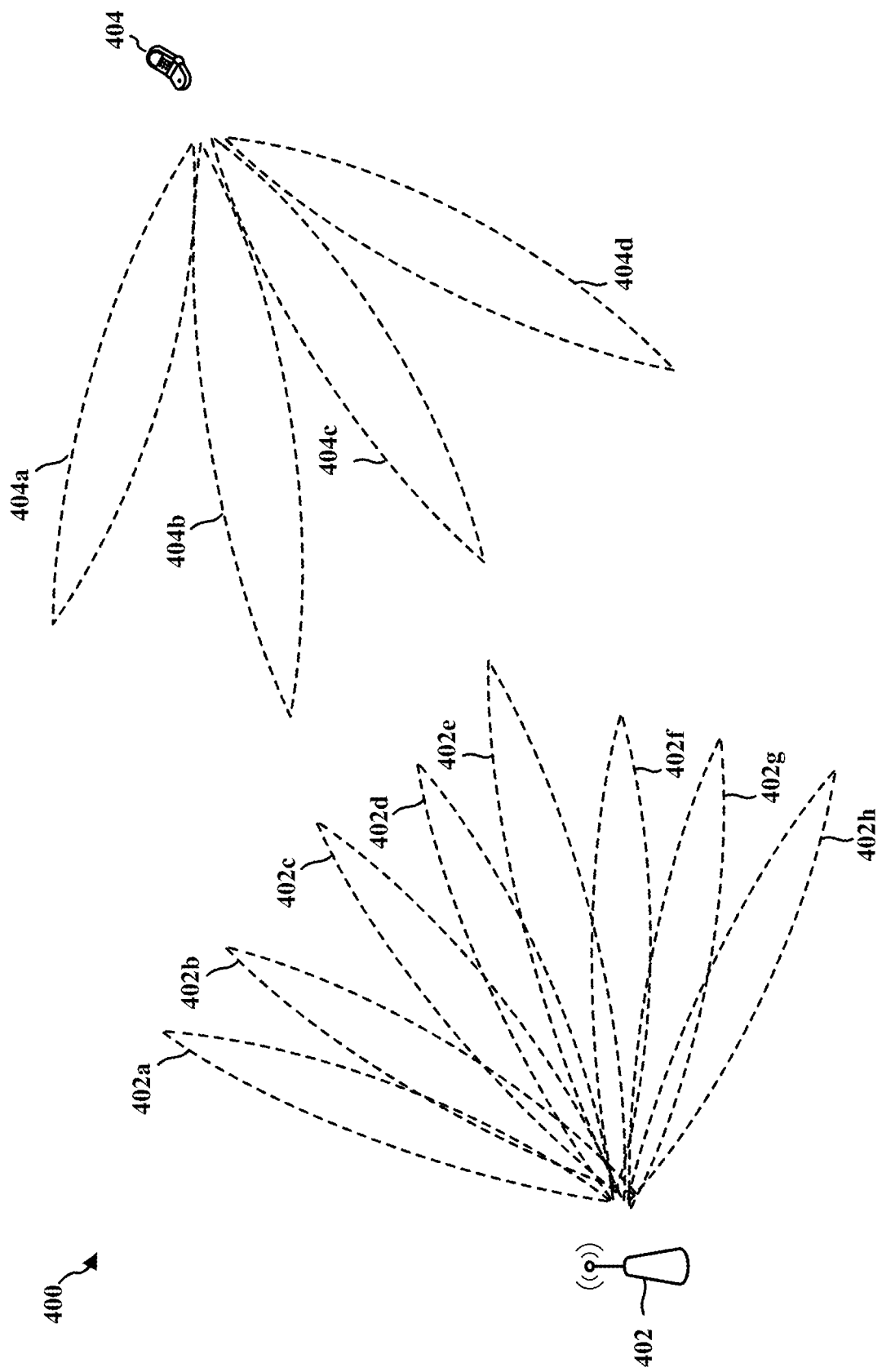
FIG. 4 is a diagram illustrating a base station in communication with a UE.

FIG. 4 is a diagram 400 illustrating a base station 402 in communication with a UE 404. Referring to FIG. 4, the base station 402 may transmit a beamformed signal to the UE 404 in one or more of the beam directions 402*a*, 402*b*, 402*c*, 402*d*, 402*e*, 402*f*, 402*g*, 402*h*. The UE 404 may receive the beamformed signal from the base station 402 in one or more receive directions 404*a*, 404*b*, 404*c*, 404*d*. The UE 404 may also transmit a beamformed signal to the base station 402 in one or more of the directions 404*a*-404*d*. The base station 402 may receive the beamformed signal from the UE 404 in one or more of the receive beam directions 402*a*-402*h*. The base station 402/UE 404 may perform beam training to determine the best receive and transmit directions for each of the base station 402/UE 404. The transmit and receive directions for the base station 402 may or may not be the same. The transmit and receive directions for the UE 404 may or may not be the same.

In certain aspects, the base station 402 may be configured to perform a beam scan operation. For example, the base station may scan through different transmit directions 402*a*-402*h*. Additionally, the base station 402 may be configured to deactivate the beam scan process upon determining that the base station 402 is in a first state corresponding to at least one of a first set of conditional states. The base station 402 may also be configured to determine a state change of the apparatus, e.g., a change from the first state to a second state. Additionally, the base station 402 may be configured to restart the beam scan operation upon determining that the apparatus is in a second state corresponding to at least one of a second set of states and perform the beam scanning operation upon activating the beam scanning process. The beam scanning operation may be a scan of a plurality of beams, e.g., a scan of a plurality of beam directions. The beam scanning process may be one or more details of how a beam scanning operation is performed. For example, the beam scanning process may provide the order the beams are scanned; the scanning time for each beam, which may not be equal for each beam; beam scans that may be repeated; or other aspects of performing a beam scan.

In certain aspects, the UE 404 may be configured to perform a beam scan operation. For example, the base station may scan through different transmit directions 404*a*-404*d*. Additionally, the UE 404 may be configured to deactivate the beam scan process upon determining that the UE 404 is in a first state corresponding to at least one of a first set of conditional states. The UE 404 may also be configured to determine a state change of the apparatus, e.g., a change from the first state to a second state. Additionally, the UE 404 may be configured to activating the beam scan operation upon determining that the apparatus is in a second state corresponding to at least one of a second set of conditional states and to continue to perform the beam scan operation, e.g., by proceeding to scan through different transmit directions. The beam scan operation may continue until the UE determines another state change from the second state to one of the first set of conditional states. Thus, the UE may continue to transition between performing the beam scan operation and refraining from performing the beam scan operation based on whether the UE is determined to be in one of the first set of conditional states or the second set of conditional states.

Examples referring to millimeter wave (mmW) cellular systems are described herein. It will be understood that the systems and methods described may be applied to beam forming in other wireless communications systems, including other cellular systems.

In an example, mmW cellular systems are part of 5G NR. The example mmW cellular systems may offer very high data rates at ultra-low latencies. For communications systems that offer very high data rates at ultra-low latencies, such as mmW cellular systems in 5G NR, overcoming poor link margins may be an issue. Beamforming may be used to overcoming the poor link margins of, e.g., mmW systems.

In an aspect, the 5G NR specification may allow a base station and a UE to sweep through beams, also referred to herein as scanning through different transmit directions, to determine a beam to use for a communication, e.g., a data communication. For example, the base station or the UE may scan through beams in codebooks to allow beamforming. Additionally, the 5G NR specification may allow a certain beam sweep period. (An example beam sweep period from pre-5G NR communication systems is 5-20 ms.)

In an aspect, when a mmW radio is turned on, e.g., in a UE or a base station, the UE (or base station) may perform beam scanning to determine which beam to use for communication. The beam scanning may consume a relatively large amount of power or other resources. In some aspects, to reduce power or reduced the use of other resources, beams may be scanned at a slower rate, e.g., at a slower rate than the beam scan rate dictated in a specification.

In an aspect, an apparatus such as a UE or base station may determine when to turn beam scanning on and off, e.g., to conserve power or other resources. For example, the UE or base station may turn mmW radio beam scanning on and off.

Beam scanning may be discontinued, e.g., turned off, for a period based on any of a number of potential factors that indicate that the apparatus may not need to perform beam scanning, e.g., beam scanning at mmW frequencies. The determination to refrain from beam scanning may be temporary, and the apparatus may determine to resume beam scanning based on any of a second set of factors that indicate a need for beam scanning. Accordingly, an apparatus, such as a UE or base station may turn beam scanning protocols on/off based on current circumstances for that device.

Example scenarios where beam scanning, e.g., mmW beam scanning, may be unnecessary include, but are not limited to, a UE not being within a coverage area, the UE screen being turned off, the UE being inside of a user's pocket or other container with the screen turned on or off, a low data rate scenario, a user gesture suggesting a voice call is being made (accordingly, only a low-rate link is needed). It will be understood that some items may overrule other items. For example, when the UE screen is on, but the UE is in a user's pocket, bag, or other container, it is likely the UE may be in the inactive mode.

Aspects of the systems and methods described herein provide techniques to skip, or otherwise refrain from, beam scanning based on state determinations by a UE or base station. For example, in an aspect, an apparatus may turn on mmW radio and scan for a Received Signal Strength Indicator (RSSI) before determining that mmW radio needs to be shut down. An aspect may realize gains in battery savings and efficient use of communication resources by not turning on the mmW radio. For example, UEs may save energy, e.g., battery power by refraining from turning on the mmW radio for beam scanning. As a consequence, UEs may avoid heating up, which may also raise ambient temperature. For example, when a UE temperature rises, heat from the UE may heat the area around the UE. The UE may heat the area around the UE particularly when the UE is within a small contained area such as a glove box of a vehicle or a pocket. In an aspect, UEs may use low-rate links instead of high-power consuming high-rate links to meet low-rate demands.

Figure 5:
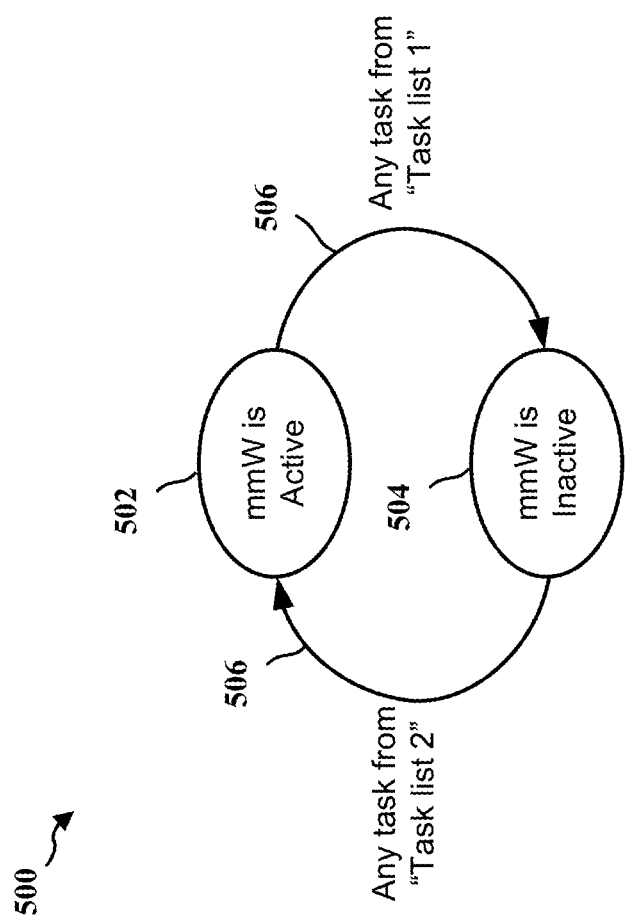
FIG. 5 is a state diagram illustrating an example of base station or UE states.

FIG. 5 is a state diagram illustrating an example 500 of base station 102, 310, 402, or UE 104, 350, 404 states (e.g., an active state 502, an inactive state 504). The base station 102, 310, 402, or the UE 104, 350, 404 may be in the active state 502 or the inactive state 504. For example, the base station 102, 310, 402 or the UE 104, 350, 404 may be in the active state 502 when the base station 102, 310, 402 or the UE 104, 350, 404 are in a communications mode that uses beam scanning, e.g., mmW radio.

The base station 102, 310, 402, or the UE 104, 350, 404 may transition 506 from an active state 502 to the inactive state 504. The transition 506 may be based on a determination regarding a state of the UE or base station. For example, the UE 104, 350, 404 may transition 506 to the inactive state 504 based on the UE 104, 350, 404 screen being in a locked state, the UE 104, 350, 404 screen being in an off state, the UE 104, 350, 404 being in a pocket, the UE 104, 350, 404 being in a voice mode, the UE 104, 350, 404 not being in a data mode, the UE 104, 350, 404 being in a low-rate mode, and/or the UE 104, 350, 404 outside or leaving a coverage area (FIG. 1, 110, 110'). The UE may monitor these factors to determine when one has occurred. When the UE determines that the factor or state has occurred, the UE the may transition to an inactive beam scan state, e.g., 504, in which the UE refrains from performing beam scanning. The base station 102, 310, 402, may transition to the inactive state 504 when no UEs 104, 350, 404 in a beam scanning state are being serviced by the base station. Thus, when a base determines that no UEs in a beam scanning state, e.g., mmW is active as at 502, are being served by the base station, the base station may transition to an inactive beam scan state in which the base station refrains from performing beam scanning.

Based on the transition 506, the base station 102, 310, 402, or the UE 104, 350, 404 may be in the inactive state 504. While in the inactive state 504, the UE or base station may refrain from performing beam scanning.

The base station 102, 310, 402, or the UE 104, 350, 404 may transition 508 from the inactive state 504 to the active state 502. For example, the UE 104, 350, 404 may transition 508 states to the active state 502 when the UE 104, 350, 404 determines that the UE screen is in an unlocked state, the UE 104, 350, 404 screen is in an on state, the UE 104, 350, 404 is not in a pocket/bag/other container, the UE 104, 350, 404 not being in a voice mode, the UE 104, 350, 404 being in a data mode, the UE 104, 350, 404 being in a high-rate mode, the UE 104, 350, 404 being inside or entering a coverage area (FIG. 1, 110, 110'). When the UE determines that the factor or state has occurred, the UE the may transition from the inactive state to an active state 502, in which the UE performs/resumes performing mmW beam scanning. Similarly, a base station may determine to transition from an inactive state 504 to an active state 502 when the base station determines that one or more UEs 104, 350, 404 serviced by the base station 102, 310, 402 are in the beam scanning state, or when the base station 102, 310, 402 determines that at least one of the UEs 104, 350, 404 serviced by the base station is expected to enter a beam scanning state. When the transition to the active state 502 is determined, the base station may begin/resume beam scanning. In some examples, a current state or changing states may occur based on a user setting. For example, a user may select the factor(s) that cause a UE to refrain from beam scanning.

An aspect may associate a binary state (active or inactive) for the base station 102, 310, 402, and/or the UE 104, 350, 404. The state may be associated with all subarrays/RFICs in the base station 102, 310, 402, and/or the UE 104, 350, 404.

The active state 502 may be a state when beam scanning, such as mmW beam scanning, is necessary, needed, desirable, or appropriate. The inactive state 504 may be a state when beam scanning, such as mmW beam scanning, is not necessary, needed, desirable, or appropriate.

Transitioning 506 from the active state 502 to the inactive state 504 may occur based on a detection or indication of a certain task from "task list 1," which may also be referred to as an event list, e.g., even list 1. The transition may occur based on a detection of a change to a state from a first set of conditional states. The transition 506 may lead to beam scanning such as mmW scanning becoming inactive (inactive state 504). In an inactive beam scanning state, the UE or base station may refrain from performing beam scanning.

Transitioning 508 from the inactive state 504 to the active state 502 may occur based on a detection or indication of a certain task from "task list 2," which may also be referred to as an event list, e.g., even list 2. The transition may occur based on a detection of a change to a state from a second set of conditional states. The first set of conditional states, which indicate an inactive state, may be different from the second set of conditional states that indicate an active state. The transition 508 may leads to beam scanning such as mmW scanning becoming active (active state 502). Thus, in the active state, the UE or base station may perform/resume performing beam scanning.

Any task from "event list 1" or "event list 2" may be associated with the activation/inactivation of a UE sensor and can thus be detected. "Event list 1" may include a UE screen being locked. The UE screen being locked may be detected via screen lock sensor and/or the pressing of a page off button, e.g., detection of the pressing of the page off button. Event list 1 may also include the UE being in a pocket, bag, container, or otherwise blocked. The UE being in a pocket or otherwise blocked may be determined via a proximity sensor or Reference Signal Received Power (RSRP) measurement. As Blockage loss due to fabric will cause an increased RSRP measurement. Therefore, the UE may be determined to be in an inactive state when proximity measurement, such as an RSRP, meets a threshold. The threshold may be selected based on an indication that the device is in a pocket, bag, container, or otherwise blocked. Event list 1 may also include the UE being in a voice mode. The UE being in voice mode may be detected via a capacitive sensor for proximity to body and/or via a motion sensor that detects specific gestures or movements.

"Event list 2" may include a UE screen being turned on. The UE screen being turned on may be detected via activation of a home/page on button. Event list 2 may also include the UE being in a data mode. The UE being in a data mode may be determined based on detecting a portrait mode or a landscape mode. The portrait mode or landscape mode may be detected via a gyroscope and/or a motion sensor. The gyroscope and/or the motion sensor may be used to detect specific gestures leading to portrait or landscape modes.

The systems and methods described herein may be used to predict when beam scanning may be turned on or off. For example, these systems and methods may predict when beam scanning is likely to be needed so that the beam scanning may be turned on shortly prior to the need for the beam scanning. The beam scanning may be turned on shortly prior to the need for the beam scanning so that the beam scanning may be complete or at least partially complete when an apparatus is to transmit or receive data. Accordingly, the apparatus may be ready, or at least closer to being ready, to transmit or receive the data.

As discussed above, considerations for a UE entering an active state may include any combination of the UE screen being in an unlocked state, the UE screen being in an on state, the UE not being in a pocket, the UE not being in a voice mode, the UE being in a data mode, the UE being in a high-rate mode, the UE being inside or entering a coverage area. At a base station, considerations regarding entering an active state may be based on one or more UEs serviced by the base station being in the beam scanning state, the UE inside or entering a coverage area, or the base station determining at least one of the UEs serviced by the base station is expected to enter a beam scanning state. Considerations such as the UE screen being in an unlocked state, the UE screen being in an on state, the UE not being in a pocket, the UE not being in a voice mode, the UE being in a data mode, the UE being in a high-rate mode, the UE outside or leaving a coverage area, or at a base station, one or more UEs serviced by the base station being in the beam scanning state or the base station determining at least one of the UEs serviced by the base station is expected to enter a beam scanning state may indicate that the apparatus (UE or base station) may predict a need to perform beam forming in the near future or may indicate a current need to perform beam scanning.

As discussed above, considerations for entering an inactive state at a UE may include the UE screen being in a locked state, the UE screen being in an off state, the UE being in a pocket, the UE being in a voice mode, the UE not being in a data mode, the UE being in a low-rate mode, the UE being outside or leaving a coverage area, or, at a base station, no UEs being serviced by the base station while the UEs are in a beam-scanning state. Entering the inactive state may save battery power at the UE or save other resources used to perform beam scanning so that these resources may be used for other purposes.

In an aspect, a current state or changing states may be based on a user setting. In an aspect, the user setting may be a direct setting, such as a setting to disallow beam scanning (and perhaps the corresponding services that may need beam scanning), e.g., to save battery power. In another aspect, the user setting may be an indirect setting, for example, the user may request a low power mode. Beam scanning may be disabled as part of changes to settings to multiple operational aspects to reduce power consumption, e.g., beam scanning, screen brightness settings, display deactivation delay times, or any other function that may be configured to save power.

Figure 6:
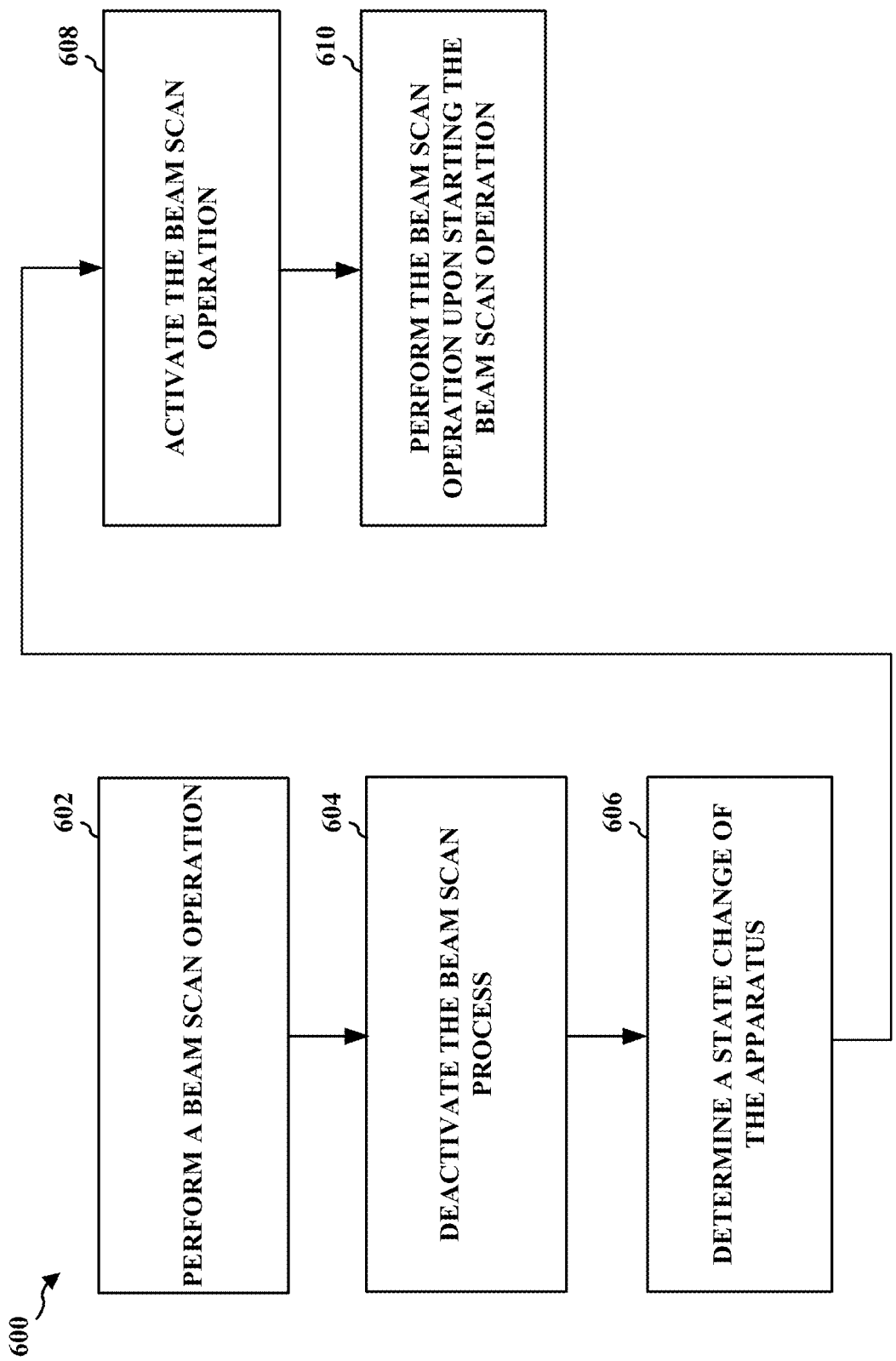
FIG. 6 is a flowchart of a method of wireless communication.

FIG. 6 is a flowchart 600 of a method of wireless communication. The method may be performed by a UE or a base station (e.g., the UE 104, 350, 404 or base station 102, 310, 402. At 602, the UE or base station (an apparatus) performs a beam scan operation, the beam scan operation being part of an active beam scanning process. The beam scan operation may be the true BRS scanning (e.g., a base station and a UE running through beams over, for example, SSBs). The beam scan process may be the underlying steady-state operation corresponding to a certain beam scanning timer. An aspect may set the timer to different values based on whether the UE is in an active or inactive state (e.g., corresponding to different task lists). The inactive state corresponds to a default timer value where no scanning happens, the active state corresponds to timer value where beam scanning occurs.

For example, the UE 104, 350, 404 or base station 102, 310, 402 performs a beam scan operation (e.g., in different beam directions 402a-402h, 404a-404d), the beam scan operation being part of an active beam scanning process. In an aspect, the beam scan operation at 602 performed as part of an active beam scanning process and may be an initial beam scan performed before the beam scan operation performed at step 608. The beam scan may be a mmW beam scanning. In a beam scan, the UE or base station may transmit or receive information over a series of angles using an antenna or antenna array.

At 604, the UE or base station (the apparatus) deactivates the beam scan process upon determining that the apparatus is in a first state corresponding to at least one of a first set of conditional states. For example, the UE 104, 350, 404 or base station 102, 310, 402 deactivates the beam scan process (e.g., beam scan in different beam directions 402a-402h, 404a-404d) upon determining that the apparatus (UE 104, 350, 404 or base station 102, 310, 402) is in a state corresponding to at least one of a first set of conditional states. For example, the first set of conditional states for a UE (UE 104, 350, 404 or base station 102, 310, 402) may include any combination of the UE screen being locked, the UE being located in a pocket, bag, or other container, or the UE being in other inactive states, e.g., during tasks described in connection with "Event List 1." In this example, when the UE determines that the UE comprises one of these states, the UE may stop the beam scan operation.

At 606, the UE or base station (the apparatus) may determine a state change of the apparatus. For example, the UE 104, 350, 404 or base station 102, 310, 402 may determine a state change (e.g., transition 508) of the apparatus (UE 104, 350, 404 or base station 102, 310, 402) from the first state to a second state. The transition may correspond to the examples described in connection with transition 506. For example, the state change may be determined based on a UE screen being turned on, a UE being in a data mode, or other factors indicating an active state.

At 608, the UE or base station (the apparatus) activates the beam scan operation upon determining that the apparatus is in a second state, e.g., 502, corresponding to at least one of a second set of conditional states different from the first set of states. For example, the UE 104, 350, 404 or base station 102, 310, 402 activates/reactivates the beam scan operation (e.g., in different beam directions 402a-402h, 404a-404d) upon determining that the apparatus (UE 104, 350, 404 or base station 102, 310, 402) is in a state corresponding to at least one of a second set of conditional states different from the first set of states. For example, the second set of conditional states for a UE (UE 104, 350, 404 or base station 102, 310, 402) may include any combination of the UE screen being turned on, the UE being in a data mode, or other active states, e.g., such as tasks described in connection with "Event List 2."

At 610, the UE or base station (the apparatus) continues to perform the beam scan operation, e.g., upon activating the beam scan operation. For example, the UE 104, 350, 404 or base station 102, 310, 402 performs the beam scan operation (e.g., in different beam directions 402a-402h, 404a-404d) upon activating the beam scan operation. The beam scan may be a mmW beam scanning. In a beam scan, the UE or base station may continue to transmit or receive information over a series of angles using an antenna or antenna array.

In an aspect, the apparatus may be a UE. The first set of conditional states may include at least one of the UE screen being in a locked state, the UE screen being in an off state, the UE being in a pocket/bag/container, the UE being in a voice mode, the UE being in a mode other than a data mode, or the UE being in a low-rate mode. The second set of conditional states may include at least one of the UE screen being in an unlocked state, the UE screen being in an on state, the UE being outside of a pocket, the UE being in a mode other than a voice mode, the UE being in a data mode, or the UE being in a high-rate mode.

In an aspect, the apparatus may be a base station. The first set of conditional states may include no UEs in a beam scanning state being serviced by the base station. The second set of conditional states may include at least one UE serviced by the base station that is in the beam scanning state or that is expected to enter a beam scanning state.

In an aspect, the state corresponding to at least one of the first set of conditional states is a beam scanning inactive state (e.g., inactive state 504) and the first set of conditional states corresponds to any combination of tasks or states described in connection with the first event list.

In an aspect, the state corresponding to at least one of the second set of conditional states is a beam scanning active state (e.g., active state 502) and the second set of conditional states corresponds to any combination of tasks or states described in connection with the second event list.

Figure 7:
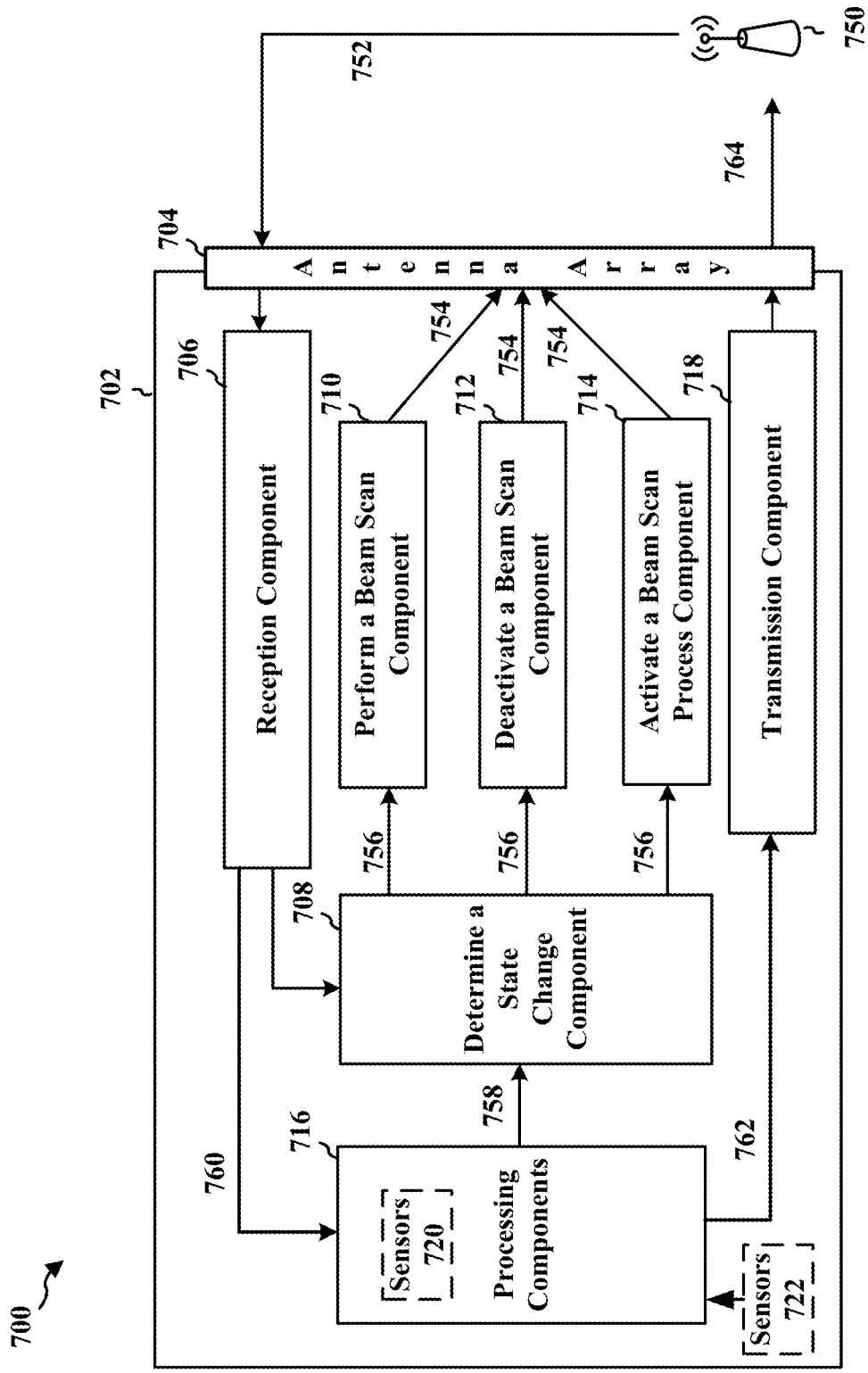
FIG. 7 is a conceptual data flow diagram illustrating the data flow between different means/components in an exemplary apparatus.

FIG. 7 is a conceptual data flow diagram 700 illustrating the data flow between different means/components in an exemplary apparatus 702. The apparatus may be a UE or a base station. A typical implementation of the systems and methods described herein will be a UE, however. The apparatus includes a reception component 706 that receives signals 752 through an antenna array 704, a state change component 708 that that determines state changes, a perform a beam scan component 710 that controls the antenna array 704 to cause a beam scan, a deactivate a beam scan component 712 that determines state changes to control the antenna array 704 to stop a beam scan, a activate beam scanning process component 714 that controls the antenna array 704 to start a beam scanning processes based on a state. The perform a beam scan component 710, the deactivate a beam scan component 712 and the activate beam scanning process component 714 may control the antenna array 704 using control signals 754, and a transmission component 718 that transmits signals 764.

The perform a beam scan component 710, the deactivate a beam scan component 712, and the activate beam scanning process component 714 may control the antenna array 704. The perform a beam scan component 710, the deactivate a beam scan component 712, and the activate beam scanning process component 714 may receive state change information 756 from the determine state change component 708. The determine state change component 708 may determine state changes based on information 758 from processing components 716. The processing components 716 may receive information 760 and transmit information 762. The information 758 may be based on received information 760, sensors 720 that are part of the processing components 716, other sensors 722, or other data sources or components (not shown).

The apparatus may include additional components that perform each of the blocks of the algorithm in the aforementioned flowchart of FIG. 6. As such, each block in the aforementioned flowchart of FIG. 6 may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

Figure 8:
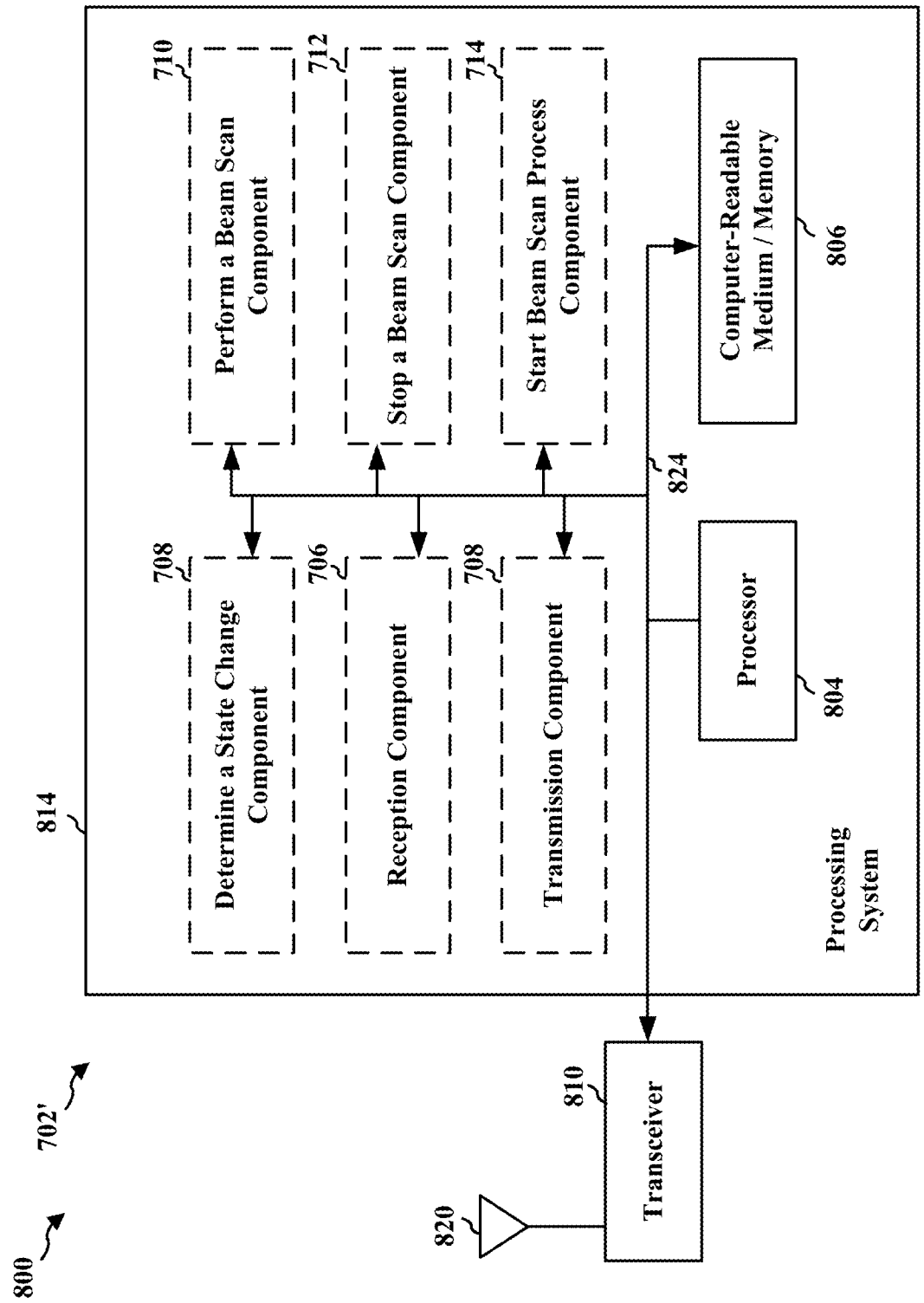
FIG. 8 is a diagram illustrating an example of a hardware implementation for an apparatus employing a processing system.

FIG. 8 is a diagram 800 illustrating an example of a hardware implementation for an apparatus 702' employing a processing system 814. The processing system 814 may be implemented with a bus architecture, represented generally by the bus 824. The bus 824 may include any number of interconnecting buses and bridges depending on the specific application of the processing system 814 and the overall design constraints. The bus 824 links together various circuits including one or more processors and/or hardware components, represented by the processor 804, the components 706, 708, 710, 712, 714, 716, 718, and the computer-readable medium/memory 806. The bus 824 may also link various other circuits such as timing sources, peripherals, voltage regulators, and power management circuits, which are well known in the art, and therefore, will not be described any further.

The processing system 814 may be coupled to a transceiver 810. The transceiver 810 is coupled to one or more antennas 820 (or an antenna array). The transceiver 810 provides a means for communicating with various other apparatus over a transmission medium. The transceiver 810 receives a signal from the one or more antennas 820, extracts information from the received signal, and provides the extracted information to the processing system 814, specifically the reception component 706. In addition, the transceiver 810 receives information from the processing system 814, specifically the transmission component 718, and based on the received information, generates a signal to be applied to the one or more antennas 820. The processing system 814 includes a processor 804 coupled to a computer-readable medium/memory 806. The processor 804 is responsible for general processing, including the execution of software stored on the computer-readable medium/memory 806. The software, when executed by the processor 804, causes the processing system 814 to perform the various functions described, supra, for any particular apparatus. The computer-readable medium/memory 806 may also be used for storing data that is manipulated by the processor 804 when executing software. The processing system 814 further includes at least one of the components 706, 708, 710, 712, 714, 716, 718, 720. The components may be software components running in the processor 804, resident/stored in the computer readable medium/memory 806, one or more hardware components coupled to the processor 804, or some combination thereof. The processing system 814 may be a component of the base station 310 and may include the memory 376 and/or at least one of the TX processor 316, the RX processor 370, and the controller/processor 375. The processing system 814 may be a component of the UE 350 and may include the memory 360 and/or at least one of the TX processor 368, the RX processor 356, and the controller/processor 359.

In one configuration, the apparatus 702/702' for wireless communication includes means for performing a beam scan operation, the beam scan operation being part of an active beam scanning process, means for deactivating the beam scan process upon determining that the apparatus is in a first state corresponding to at least one of a first set of conditional states, means for determining a state change of the apparatus, means for activating the beam scanning process upon determining that the apparatus is in a second state corresponding to at least one of a second set of conditional states different from the first set of states, and means for performing the beam scan operation upon activating the beam scanning process.

The aforementioned means may be one or more of the aforementioned components of the exemplary apparatus 702 and/or the processing system 814 of the apparatus 702' configured to perform the functions recited by the aforementioned means. As described, supra, the processing system 814 may include the TX Processor 316, the RX Processor 370, and the controller/processor 375. As such, in one configuration, the aforementioned means may be the TX Processor 316, the RX Processor 370, and the controller/processor 375 configured to perform the functions recited by the aforementioned means.

The aforementioned means may be one or more of the aforementioned components of the exemplary apparatus 702 and/or the processing system 814 of the apparatus 702' configured to perform the functions recited by the aforementioned means. As described, supra, the processing system 814 may include the TX Processor 368, the RX Processor 356, and the controller/processor 359. As such, in one configuration, the aforementioned means may be the TX Processor 368, the RX Processor 356, and the controller/processor 359 configured to perform the functions recited by the aforementioned means.

It is understood that the specific order or hierarchy of blocks in the processes/flowcharts disclosed is an illustration of exemplary approaches. Based upon design preferences, it is understood that the specific order or hierarchy of blocks in the processes/flowcharts may be rearranged. Further, some blocks may be combined or omitted. The accompanying method claims present elements of the various blocks in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." The word "exemplary" is used herein to mean "serving as an example, instance, or illustration." Any aspect described herein as "exemplary" is not necessarily to be construed as preferred or advantageous over other aspects. Unless specifically stated otherwise, the term "some" refers to one or more. Combinations such as "at least one of A, B, or C," "one or more of A, B, or C," "at least one of A, B, and C," "one or more of A, B, and C," and "A, B, C, or any combination thereof" include any combination of A, B, and/or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, where any such combinations may contain one or more member or members of A, B, or C. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. The words "module," "mechanism," "element," "device," and the like may not be a substitute for the word "means." As such, no claim element is to be construed as a means plus function unless the element is expressly recited using the phrase "means for."

What is claimed is:

1. A method of wireless communications of an apparatus, comprising:
    performing a beam scan operation, the beam scan operation being part of a beam scanning process that is active;
    deactivating the beam scanning process upon determining that the apparatus is in a first state corresponding to at least one of a first set of conditional states;
    determining the apparatus changed from the first state to a second state corresponding to at least one of a second set of conditional states different from the first set of conditional states;
    activating the beam scanning process in response to the apparatus being in the second state; and
    performing the beam scan operation upon activating the beam scanning process;
    wherein the at least one of the first set of conditional states or the at least one of the second set of conditional states comprises a state corresponding to a data rate mode used by a user equipment (UE), wherein deactivating the beam scanning process is based on the data rate mode being a first data rate mode used by the UE and activating the beam scanning process is based on the data rate mode being a second data rate mode used by the UE, and wherein a data rate of the second data rate mode is greater than a data rate of the first data rate mode.

2. The method of claim 1, wherein the apparatus comprises the UE.

3. The method of claim 2, wherein the first set of conditional states comprises at least one of a UE screen being in a locked state, the UE screen being in an off state, the UE being in a pocket, the UE being in a voice mode, the UE being in a mode other than a data mode, the UE being in a low-rate mode, the UE being outside a coverage area, or a user setting.

4. The method of claim 2, wherein the second set of conditional states comprises at least one of a UE screen being in an unlocked state, the UE screen being in an on state, the UE being outside of a pocket, the UE being in a mode other than a voice mode, the UE being in a data mode, the UE being in a high-rate mode, the UE being inside a coverage area, or a user setting.

5. The method of claim 1, wherein:
    the first state comprises a beam scanning inactive state and the first set of conditional states corresponds to a first event list, and
    the second state comprises a beam scanning active state and the second set of conditional states corresponds to a second event list.

6. An apparatus for wireless communications, comprising:
    means for performing a beam scan operation, the beam scan operation being part of a beam scanning process that is active;
    means for deactivating the beam scanning process upon determining that the apparatus is in a first state corresponding to at least one of a first set of conditional states;
    means for determining the apparatus changed from the first state to a second state corresponding to at least one of a second set of conditional states different from the first set of conditional states;
    means for activating the beam scanning process in response to the apparatus being in the second state; and means for performing the beam scan operation upon activating the beam scanning process;

wherein the at least one of the first set of conditional states or the at least one of the second set of conditional states comprises a state corresponding to a data rate mode used by a user equipment (UE), wherein the means for deactivating the beam scanning process is based on the data rate mode being a first data rate mode used by the UE and activating the beam scanning process is based on the data rate mode being a second data rate mode used by the UE, and wherein a data rate of the second data rate mode is greater than a data rate of the first data rate mode.

7. The apparatus of claim 6, wherein the apparatus comprises the UE.

8. The apparatus of claim 7, wherein the first set of conditional states comprises at least one of a UE screen being in a locked state, the UE screen being in an off state, the UE being in a pocket, the UE being in a voice mode, the UE being in a mode other than a data mode, the UE being in a low-rate mode, the UE being outside a coverage area, or a user setting.

9. The apparatus of claim 7, wherein the second set of conditional states comprises at least one of a UE screen being in an unlocked state, the UE screen being in an on state, the UE being outside of a pocket, the UE being in a mode other than a voice mode, the UE being in a data mode, the UE being in a high-rate mode, the UE being inside a coverage area, or a user setting.

10. The apparatus of claim 6, wherein:
the first state comprises a beam scanning inactive state and the first set of conditional states corresponds to a first event list, and
the second state comprises a beam scanning active state and the second set of conditional states corresponds to a second event list.

11. An apparatus for wireless communications, comprising:
a memory; and
at least one processor coupled to the memory and configured to:
perform a beam scan operation, the beam scan operation being part of a beam scanning process that is active;
deactivate the beam scanning process upon determining that the apparatus is in a first state corresponding to at least one of a first set of conditional states;
determine the apparatus changed from the first state to a second state corresponding to at least one of a second set of conditional states different from the first set of conditional states;
activate the beam scanning process in response to the apparatus being in the second state; and
perform the beam scan operation upon activating the beam scanning process;
wherein the at least one of the first set of conditional states or the at least one of the second set of conditional states comprises a state corresponding to a data rate mode used by a user equipment (UE), wherein the at least one processor is further configured to deactivate the beam scanning process is based on the data rate mode being a first data rate mode used by the UE and activating the beam scanning process is based on the data rate mode being a second data rate mode used by the UE, and wherein a data rate of the second data rate mode is greater than a data rate of the first data rate mode.

12. The apparatus of claim 11, wherein the apparatus comprises the UE.

13. The apparatus of claim 12, wherein the first set of conditional states comprises at least one of a UE screen being in a locked state, the UE screen being in an off state, the UE being in a pocket, the UE being in a voice mode, the UE being in a mode other than a data mode, the UE being in a low-rate mode, the UE being outside a coverage area, or a user setting.

14. The apparatus of claim 12, wherein the second set of conditional states comprises at least one of a UE screen being in an unlocked state, the UE screen being in an on state, the UE being outside of a pocket, the UE being in a mode other than a voice mode, the UE being in a data mode, the UE being in a high-rate mode, the UE being inside a coverage area, or a user setting.

15. The apparatus of claim 11, wherein:
the first state comprises a beam scanning inactive state and the first set of conditional states corresponds to a first event list, and
the second state comprises a beam scanning active state and the second set of conditional states corresponds to a second event list.

16. A non-transitory computer-readable medium storing computer executable code, comprising code to:
perform a beam scan operation, the beam scan operation being part of a beam scanning process that is active;
deactivate the beam scanning process upon determining that an apparatus is in a first state corresponding to at least one of a first set of conditional states;
determine the apparatus changed from the first state to a second state corresponding to at least one of a second set of conditional states different from the first set of conditional states;
activate the beam scanning process in response to the apparatus being in the second state; and
perform the beam scan operation upon activating the beam scanning process;
wherein the at least one of the first set of conditional states or the at least one of the second set of conditional states comprises a state corresponding to a data rate mode used by a user equipment (UE), wherein the code to deactivate the beam scanning process includes code to deactivate the beam scanning process based on the data rate mode being a first data rate mode used by the UE and the code to activate the beam scanning process comprises code to activate the beam scanning process based on the data rate mode being a second data rate mode used by the UE, and wherein a data rate of the second data rate mode is greater than a data rate of the first data rate mode.

17. The non-transitory computer-readable medium of claim 16, wherein the computer executable code is executed on the UE.

18. The non-transitory computer-readable medium of claim 17, wherein the first set of conditional states comprises at least one of a UE screen being in a locked state, the UE screen being in an off state, the UE being in a pocket, the UE being in a voice mode, the UE being in a mode other than a data mode, the UE being in a low-rate mode, the UE being outside a coverage area, or a user setting.

19. The non-transitory computer-readable medium of claim 17, wherein the second set of conditional states comprises at least one of a UE screen being in an unlocked state, the UE screen being in an on state, the UE being outside of a pocket, the UE being in a mode other than a voice mode, the UE being in a data mode, the UE being in a high-rate mode, the UE being inside a coverage area, or a user setting.

* * * * *